(12) United States Patent
Golitschek Edler von Elbwart et al.

(10) Patent No.: US 12,500,704 B2
(45) Date of Patent: Dec. 16, 2025

(54) ADJUSTING RETRANSMISSION TIMING FOR A CONFIGURED GRANT

(71) Applicant: Lenovo (Singapore) Pte. Ltd., New Tech Park (SG)

(72) Inventors: Alexander Johann Maria Golitschek Edler von Elbwart, Darmstadt (DE); Joachim Loehr, Wiesbaden (DE); Ankit Bhamri, Rödermark (DE); Karthikeyan Ganesan, Kronberg im Taunus (DE); Ali Ramadan Ali, Kraiburg am Inn (DE); Sher Ali Cheema, Ilmenau (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 18/248,368

(22) PCT Filed: Oct. 7, 2021

(86) PCT No.: PCT/IB2021/059185
§ 371 (c)(1),
(2) Date: Apr. 7, 2023

(87) PCT Pub. No.: WO2022/074592
PCT Pub. Date: Apr. 14, 2022

(65) Prior Publication Data
US 2023/0412323 A1 Dec. 21, 2023

Related U.S. Application Data

(60) Provisional application No. 63/088,939, filed on Oct. 7, 2020.

(51) Int. Cl.
*H04L 1/1867* (2023.01)

(52) U.S. Cl.
CPC ............ *H04L 1/1887* (2013.01); *H04L 1/188* (2013.01); *H04L 1/1893* (2013.01)

(58) Field of Classification Search
CPC ..... H04L 1/1887; H04L 1/1883; H04L 1/188; H04L 1/1893; H04L 5/0044;
(Continued)

(56) References Cited

U.S. PATENT DOCUMENTS 11,979,222 B2 * 5/2024 Sedin .................... H04L 1/1883
2014/0269629 A1 9/2014 Yang et al.
(Continued)

FOREIGN PATENT DOCUMENTS

CN 111742511 A 10/2020
EP 3410150 A1 * 12/2018 ........... G01S 13/222
(Continued)

OTHER PUBLICATIONS

PCT/IB2021/059185, "Notification of Transmittal of the International Search Report and the Written Opinion of the International Searching Authority, or the Declaration", International Searching Authority, Dec. 6, 2021, pp. 1-11.
(Continued)

*Primary Examiner* — Phong La
(74) *Attorney, Agent, or Firm* — Kunzler Bean & Adamson

(57) ABSTRACT

Apparatuses, methods, and systems are disclosed for adjusting retransmission timing for a configured grant. One apparatus includes a processor that determines an offset value for a retransmission timer associated with a configured grant for communications between the UE and a mobile wireless communication network. The processor starts the retransmission timer adjusted by the offset value in response to transmission of data corresponding to a transport block ("TB") on a hybrid automatic repeat request ("HARQ") process. The processor detects expiration of the retransmission timer associated with the configured grant. In response to detecting expiration of the retransmission timer, the processor determines a transmission resource from a plurality of configured transmission resources for retransmitting a TB.

20 Claims, 7 Drawing Sheets

(58) Field of Classification Search
CPC ... H04L 5/0042; H04L 5/0053; H04L 5/0058; H04L 5/0078; H04L 5/0048; H04L 5/0037

See application file for complete search history.

(56) References Cited

U.S. PATENT DOCUMENTS

| | | | |
|---|---|---|---|
| 2020/0351031 A1* | 11/2020 | Wu | H04L 1/1883 |
| 2021/0258105 A1* | 8/2021 | Shrestha | H04L 1/1887 |
| 2021/0307108 A1* | 9/2021 | Babaei | H04W 76/18 |
| 2022/0006514 A1* | 1/2022 | Sedin | H04B 7/18528 |
| 2023/0412323 A1* | 12/2023 | Golitschek Edler von Elbwart ... H04L 1/1887 | |
| 2024/0089766 A1* | 3/2024 | Kim | H04W 52/0216 |

FOREIGN PATENT DOCUMENTS

| | | | | |
|---|---|---|---|---|
| KR | 102159450 B1 * | 4/2019 | | |
| WO | WO-2020092831 A1 * | 5/2020 | ........... | H04L 1/0003 |
| WO | WO-2020167657 A1 * | 8/2020 | ........... | H04L 1/1812 |
| WO | WO-2020167896 A1 * | 8/2020 | ........... | H04L 5/0051 |
| WO | WO-2020200036 A1 * | 10/2020 | ......... | H04L 27/2602 |
| WO | WO-2020223420 A1 * | 11/2020 | ........... | H04L 1/1819 |

OTHER PUBLICATIONS

3GPP, "3rd Generation Partnership Project; Technical Specification Group Radio Access Network; NR; Physical layer procedures for data (Release 16)", 3GPP TS 38.214 V16.2.0, Jun. 2020, pp. 1-163.

3GPP, "3rd Generation Partnership Project; Technical Specification Group Radio Access Network; NR; Medium Access Control (MAC) protocol specification (Release 16)", 3GPP TS 38.321 V16.1.0, Jul. 2020, pp. 1-151.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

* cited by examiner

ADJUSTING RETRANSMISSION TIMING FOR A CONFIGURED GRANT

CROSS-REFERENCE TO RELATED APPLICATIONS

This application claims priority to U.S. Provisional Patent Application No. 63/088,939 entitled "HARQ RETRANSMISSION DEFERRAL ON UNLICENSED SPECTRUM" and filed on Oct. 7, 2020, for Alexander Johann Maria Golitschek Edler von Elbwart et al., which is incorporated herein by reference.

FIELD

The subject matter disclosed herein relates generally to wireless communications and more particularly relates to adjusting retransmission timing for a configured grant.

BACKGROUND

In certain wireless communication systems, a User Equipment device ("UE") is able to connect with a fifth-generation ("5G") core network (i.e., "5GC") in a Public Land Mobile Network ("PLMN"). For operation in an unlicensed spectrum, operating without any listen before talk ("LBT") is one option especially in controlled environments. Even though spatial separation and narrow beams can guarantee a certain level of collision avoidance, it is nevertheless possible that configured grant uplink transmissions from different UEs collide in the same reception beam of a gNB, requiring a retransmission of two or more colliding packets. Due to configured periodicities, there is a risk that retransmissions collide systematically, causing the whole packet transmission to fail.

BRIEF SUMMARY

Disclosed are procedures for adjusting retransmission timing for a configured grant. Said procedures may be implemented by apparatus, systems, methods, and/or computer program products.

One method of a User Equipment device ("UE") includes determining an offset value for a retransmission timer associated with a configured grant for communications between the UE and a mobile wireless communication network. In one embodiment, the method includes starting the retransmission timer adjusted by the offset value in response to transmission of data corresponding to a transport block ("TB") on a hybrid automatic repeat request ("HARQ") process. In one embodiment, the method includes detecting expiration of the retransmission timer associated with the configured grant. In one embodiment, in response to detecting expiration of the retransmission timer, the method includes determining a transmission resource from a plurality of configured transmission resources for retransmitting a TB.

One method of a network device in a mobile communication network includes determining an offset value for a retransmission timer associated with a configured grant for communications between a user equipment ("UE") and a mobile wireless communication network. In one embodiment, the method includes transmitting the offset value to the UE. In one embodiment, the method includes configuring the UE to apply the offset value to the retransmission timer associated with the configured grant for retransmissions of transport blocks ("TBs") from the UE to the mobile wireless communication network.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
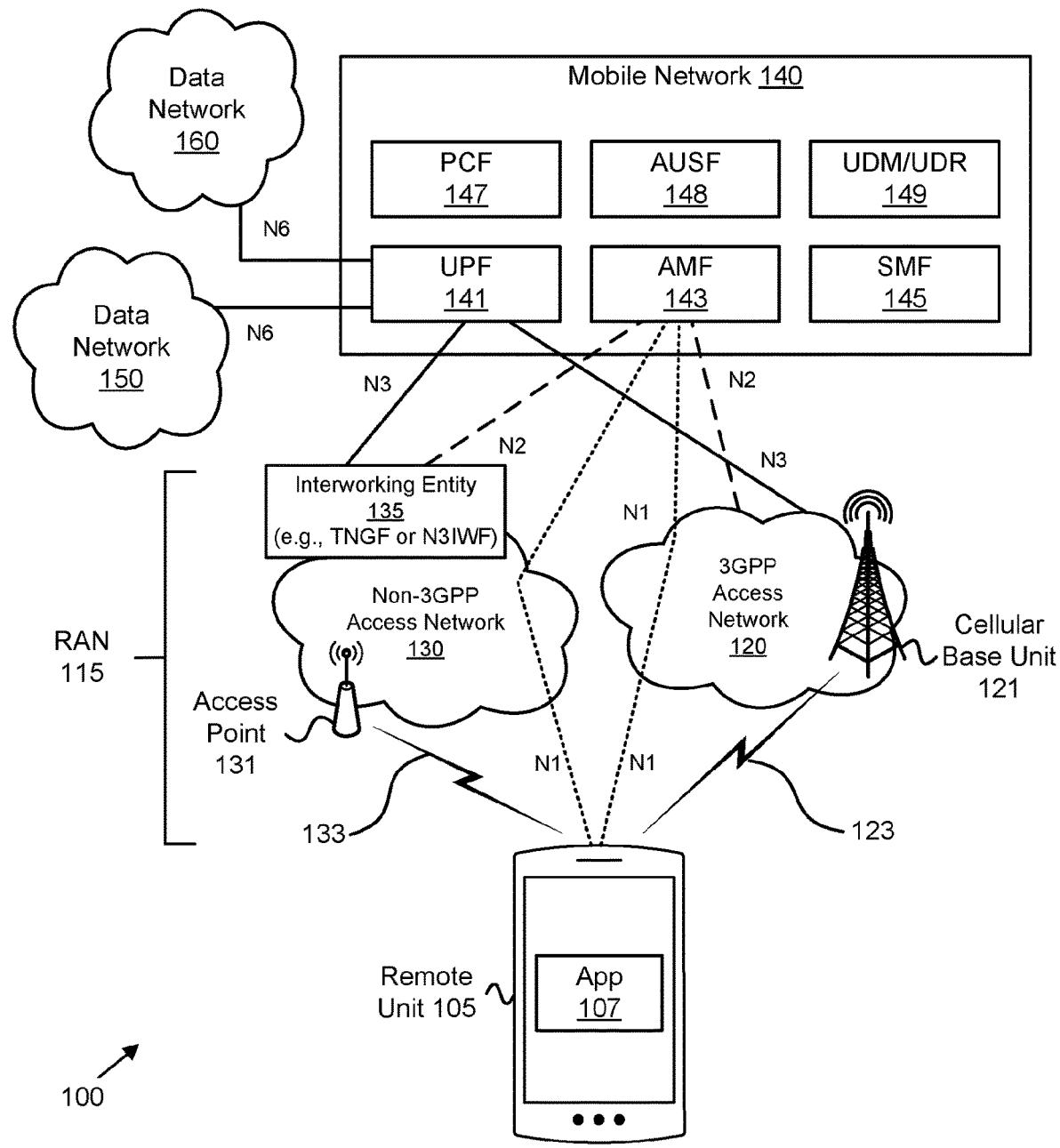
FIG. 1 is a schematic block diagram illustrating one embodiment of a wireless communication system for adjusting retransmission timing for a configured grant.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for adjusting retransmission timing for a configured grant. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For operation in an unlicensed spectrum, operating without any listen before talk ("LBT") is one option especially in controlled environments. Even though spatial separation and narrow beams can guarantee a certain level of collision avoidance, it is nevertheless possible that configured grant uplink transmissions from different UEs collide in the same reception beam of a gNB, requiring a retransmission of two or more colliding packets. Due to configured periodicities, there is a risk that retransmissions collide systematically, causing the whole packet transmission to fail.

FIG. 1 depicts a wireless communication system 100 for adjusting retransmission timing for a configured grant, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N31WF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

Regarding existing timers relevant for configured grant ("CG") transmissions, in one embodiment, a cg-RetransmissionTimer parameter indicates the initial value of the configured retransmission timer in multiples of periodicity. The value of cg-RetransmissionTimer is always less than the value of configuredGrantTimer. This field is always configured for operation with shared spectrum channel access together with harq-ProcID-Offset. This field is not configured for operation in licensed spectrum or simultaneously with harq-ProcID-Offset2.

In one embodiment, a configuredGrantTimer parameter indicates the initial value of the configured grant timer in multiples of periodicity. When cg-RetransmissonTimer is configured, if HARQ processes are shared among different configured grants on the same BWP, configuredGrantTimer is set to the same value for all of configurations on this BWP.

In one embodiment, the CG retransmission timer is configured per CG, e.g., one value of the CG retransmission timer is configured per CG. CG retransmission timer is maintained per Hybrid Automatic Repeat Request ("HARQ") process. In one embodiment, the state of HARQ feedback is considered as NACK at the expiry of the CG retransmission timer.

In one embodiment, autonomous CG retransmission is prohibited while the CG retransmission timer is running New CG transmission may also be prohibited while the CG retransmission timer is running because the CG timer is always miming when the CG retransmission timer is running.

Figure 2:
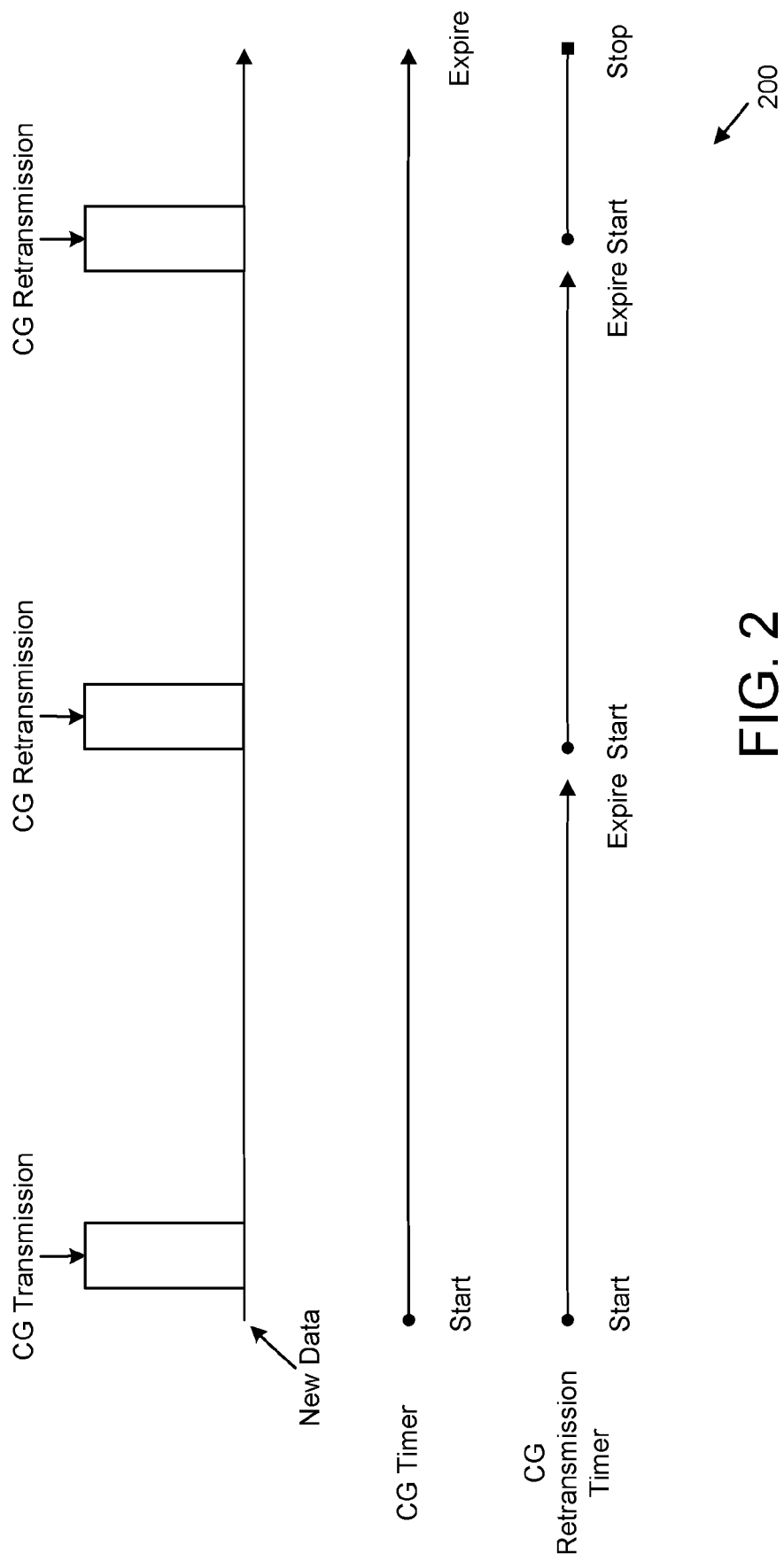
FIG. 2 is a diagram illustrating one embodiment of use of a configured grant timer and a configured grant retransmission timer.

In one embodiment, for NR-U (Rel-16), RAN2 has agreed to introduce a new timer (e.g., CG retransmission timer) as well as a legacy timer (e.g., CG timer), and has clarified the detailed behavior for each timer. Both CG timer and CG retransmission timer are used at the same time, as shown in FIG. 2.

In one embodiment, retransmission on the CG may not be possible if the CG timer is less than the CG retransmission timer, e.g., the CG timer expires before the CG retransmission timer expires because the data that is to be retransmitted will be overwritten with new data. In one embodiment, on the other hand, retransmission on the CG is possible if the CG timer is greater than the CG retransmission timer, e.g., the CG timer expires after the CG retransmission timer because the data that is to be retransmitted will not be overwritten by new data.

In one embodiment, the CG timer should not be restarted when the new timer (e.g., CG retransmission timer) expires and a retransmission is performed. Otherwise, the CG timer will never expire, and the retransmissions will continue indefinitely. CG retransmission timer should be stopped when the CG timer expires.

In one embodiment, for configured uplink grants configured with cg-RetransmissionTimer, the UE implementation selects a HARQ Process ID among the HARQ process IDs available for the configured grant configuration. The UE shall prioritize retransmissions before initial transmissions. The UE shall toggle the new data indicator ("NDI") in the CG-uplink control information ("UCI") for new transmissions and not toggle the NDI in the CG-UCI in retransmissions.

In one embodiment, new transmissions are performed on the resource and with the modulation and coding scheme ("MCS") indicated on physical downlink control channel ("PDCCH") or indicated in the Random Access Response (i.e. MAC RAR or fallbackRAR), or signalled in radio resource control ("RRC"). Retransmissions are performed on the resource and, if provided, with the MCS indicated on PDCCH, or on the same resource and with the same MCS as was used for last made transmission attempt within a bundle, or on stored configured uplink grant resources and stored MCS when cg-RetransmissionTimer is configured. Retransmissions with the same HARQ process may be performed on any configured grant configuration if the configured grant configurations have the same transport block size ("TBS").

In one embodiment, if a HARQ process receives downlink feedback information, the HARQ process shall:
stop the cg-RetransmissionTimer, if running;
if acknowledgement is indicated:
 a. stop the configuredGrantTimer, if running.

In one embodiment, if the configuredGrantTimer expires for a HARQ process, the HARQ process shall stop the cg-RetransmissionTimer, if running.

In order to avoid consistent collisions between retransmissions from different UEs on configured grant resources, in one embodiment, a random time offset is introduced where the timer offset can be applied to the CG retransmission timer value.

In one embodiment, in case a retransmission becomes necessary for a transport block ("TB") transmitted on a HARQ process associated with a configured grant, the retransmission can occur if the corresponding cg-RetransmissionTimer has expired and an additional cg-RetransmissionOffset timer has expired—assuming that no feedback/DCI requesting a retransmission has been received from NW entity. Effectively this results in an additional deferral to the expiry of the cg-RetransmissionTimer. Assuming that the initial value of the cg-RetransmissionTimer is configured by RRC, e.g., as known from TS 38.331 v16.1.0, according to one implementation, the initial value of cg-RetransmissionTimer is obtained by adding the cg-RetransmissionOffset value to the configured cg-RetransmissionTimer value.

In an alternative implementation, a new timer is autonomously started by the UE, e.g., media access control ("MAC") layer of the UE, with the initial value of cg-RetransmissionOffset after cg-RetransmissionTimer has expired, and the retransmission can occur after both cg-RetransmissionTimer and the new timer have expired.

According to an embodiment, the cg-RetransmissionOffset value is in units of timeslots of the communication system, or fractions thereof.

According to an embodiment, the cg-RetransmissionOffset is determined as a uniform random integer number from the interval [lowBound, highBound]. In one implementation, lowBound and/or highBound are configurable values, such as from a network entity like a gNB. The highBound value may be associated with the quality of service ("QoS") requirements of the traffic (e.g., reliability and/or latency requirements).

For example, a large initial value is configured for high reliability traffic, and a small value is configured for traffic with low reliability requirements. On the other hand, a small highBound value is configured for low latency requirements. In another implementation, highBound increases with the number of retransmissions of the same TB. For example, for the first retransmission highBound is determined according to a configurable value hl−1. In case a second retransmission is necessary, highBound is determined according to (2*hl−1), for a third retransmission according to (3*hl−1) and so on, so that for the nth retransmission highBound is determined according to (n*hl−1).

In another example, the progression follows an exponential function. For instance, for the first transmission, highBound is determined according to a configurable value hl−1. In case a second retransmission is necessary, highBound is determined according to (2*hl−1), for a third retransmission according to (4*hl−1) and so on, so that for the nth retransmission highBound is determined according to ($2^{n-1}$*hl−1). Those skilled in the art will appreciate that instead of the nth retransmission alternatively and equivalently the kth transmission can be used, where the first retransmission n=1 is equivalent to the second transmission k=2, so that for the kth transmission in the given examples highBound is determined according to ((k−1)*hl−1) or according to ($2^{k-2}$*hl−1), respectively.

According to one embodiment, the retransmission counter for the purpose of determining the highBound value is reset if a retransmission is scheduled by a dynamic grant (e.g., such as by a downlink control information ("DCI")) so that for the CG resource following the resource granted by the dynamic grant, highBound is determined as for the first retransmission.

According to an embodiment, the highBound and low-Bound values are in unit of timeslots of the communication system, or fractions thereof. According to an embodiment, the lowBound value is fixed to 0.

According to an embodiment, if the cg-Retransmission-Offset value is positive, then the retransmission timer is increased by the offset value, after which a UE may retransmit a packet on a configured grant resource.

According to an embodiment, if the cg-Retransmission-Offset value is negative, then the retransmission timer is decreased by the offset value, after which a UE may retransmit on a configured grant resource. According to alternative embodiment, if the cg-RetransmissionOffset value is negative, then the retransmission timer is effectively not decreased by the offset value, but keeps its configured initial value as if the cg-RetransmissionOffset had a value of 0. This allows an increased likelihood that no additional offset is applied, since the likelihood of applying no additional offset is then equivalent to the likelihood that the cg-RetransmissionOffset results in a value of 0 or less. For example, if the cg-RetransmissionOffset is determined as a uniform random integer number from the interval [−1; +1] slot, then the likelihood of not adding an offset for the retransmission is equivalent to 2/3, while the likelihood of adding an offset of one slot is 1/3.

According to an embodiment, in case a CG resource occurs in a time slot while the additional deferral time cg-RetransmissionOffset has not expired, the corresponding CG resource is skipped by the UE, so that no (re)transmission occurs on the CG resource. According to an alternative embodiment, in such a case the CG resource can be used for transmission of data associated with a different HARQ process.

According to an embodiment, the initial value of the cg-RetransmissionOffset timer could be exponentially increased for each of retransmission attempt. In another implementation, the initial value of the cg-Retransmission-Offset timer could be randomized for each retransmission attempt when no feedback/DCI requesting a retransmission has been received from a network entity.

According to an embodiment, whether the additional deferral by cg-RetransmissionOffset is applicable or not, is configurable or applicable per one or more of the following:
Per device (e.g., UE);
Per beam such as established by a quasi co-location ("QCL") assumption type-D e.g., as described in 3GPP TS 38.214 v16.2.0 clause 5.1.5;
Per CG configuration;
Per HARQ process;
Per traffic class (such as a channel access priority class, or a traffic type such as Voice, Video, Best Effort, Background);
Per logical channel priority level;
Per CG periodicity.

According to an embodiment, cg-RetransmissionOffset is not expected to be applied to a CG when the periodicity is above a certain threshold. Basically, if the periodicity is high for a CG, then it might not be appropriate to apply deferral in that case as the opportunity for retransmissions can be greatly reduced. According to an implementation, the periodicity threshold used to determine whether a cg-RetransmissionOffset is applied or not is configured by a network entity such as a gNB.

According to an embodiment, in addition or alternative to applying an additional deferral time cg-RetransmissionOffset, the cg-RetransmissionTimer is configurable or applicable per one or more of the following:
Per device (e.g., UE);
Per beam such as established by a quasi co-location ("QCL") assumption type-D;
Per CG configuration;
Per HARQ process;
Per traffic class (such as a channel access priority class, or a traffic type such as Voice, Video, Background);
Per logical channel priority level.

According to an embodiment, the initial value of the cg-RetransmissionTimer depends on the number of (re) transmissions of the transport block.

According to an embodiment, for a CG resource, additional resources can be configured for retransmissions where the UE is expected to use these additional resources for the case of a retransmission, such as when cg-RetransmissionOffset applied.

Figure 3:
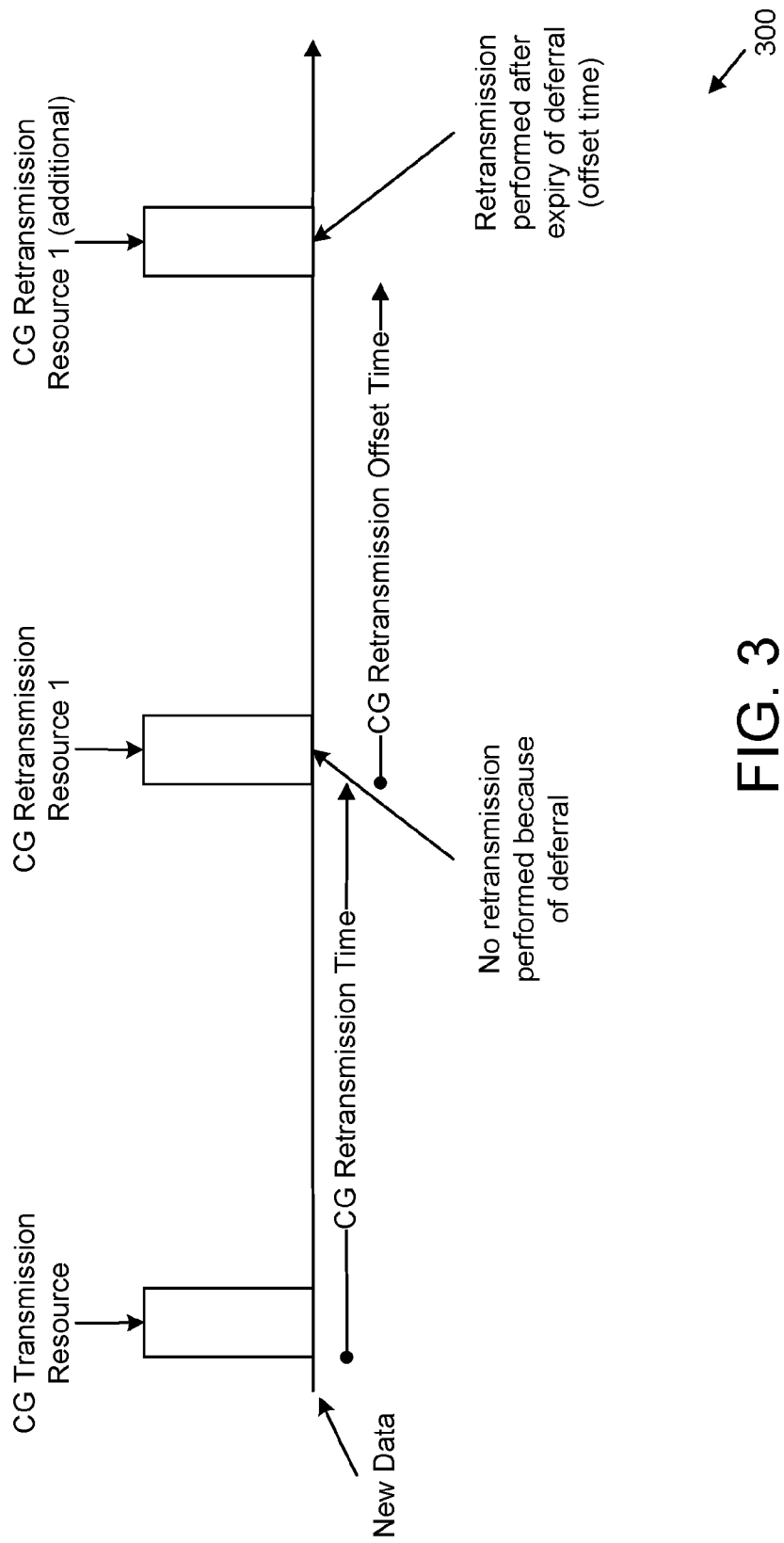
FIG. 3 is a diagram illustrating one embodiment of an example of using additional configured grant retransmission resources.

For example, as shown in FIG. 3, when cg-RetransmissionOffset is applied, the actual retransmission resources are not used. However, there is an additional CG resource for that corresponding retransmission, and it can be used by UE as it occurs even later than the deferred time. In one implementation of this embodiment, only high priority traffic can be transmitted on these additional (burst) retransmission resources. The main benefit of such additional resources, in one embodiment, is to not wait for the next retransmission occasion specially for low-latency requirements. The additional resources may comprise a burst of successive timeslots to have an increased likelihood of having the cg-RetransmissionOffset expired at at least one of these additional resources. According to one implementation, an additional resource burst is configured to occur adjacently prior to or after a CG transmission resource.

Figure 4:
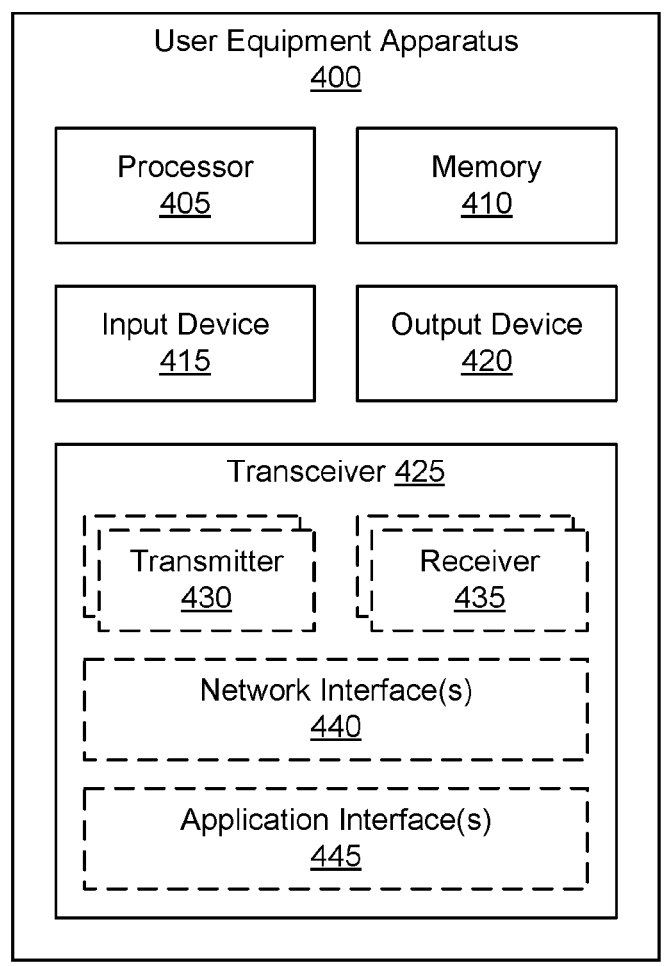
FIG. 4 is a block diagram illustrating one embodiment of a user equipment apparatus that may be used for adjusting retransmission timing for a configured grant.

FIG. 4 depicts a user equipment apparatus 400 that may be used for adjusting retransmission timing for a configured grant, according to embodiments of the disclosure. In various embodiments, the user equipment apparatus 400 is used to implement one or more of the solutions described above. The user equipment apparatus 400 may be one embodiment of the remote unit 105 and/or the UE 205, described above. Furthermore, the user equipment apparatus 400 may include a processor 405, a memory 410, an input device 415, an output device 420, and a transceiver 425.

In some embodiments, the input device 415 and the output device 420 are combined into a single device, such as a touchscreen. In certain embodiments, the user equipment apparatus 400 may not include any input device 415 and/or output device 420. In various embodiments, the user equipment apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. In some embodiments, the transceiver 425 communicates with one or more cells (or wireless coverage areas) supported by one or more base units 121. In various embodiments, the transceiver 425 is operable on unlicensed spectrum. Moreover, the transceiver 425 may include multiple UE panel supporting one or more beams. Additionally, the transceiver 425 may support at least one network interface 440 and/or application interface 445. The application interface(s) 445 may support one or more APIs. The network interface(s) 440 may support 3GPP reference points, such as Uu, N1, PC5, etc. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In certain embodiments, the processor 405 may include an application processor (also known as "main processor") which manages application-domain and operating system ("OS") functions and a baseband processor (also known as "baseband radio processor") which manages radio functions.

In various embodiments, the processor 405 controls the user equipment apparatus 400 to implement the above described UE behaviors. In one embodiment, the processor 405 determines an offset value for a retransmission timer associated with a configured grant for communications between the UE and a mobile wireless communication network. In one embodiment, the processor 405 starts the retransmission timer adjusted by the offset value in response to transmission of data corresponding to a transport block ("TB") on a hybrid automatic repeat request ("HARQ") process. In one embodiment, the processor 405 detects expiration of the retransmission timer associated with the configured grant. In one embodiment, in response to detecting expiration of the retransmission timer, the processor 405 determines a transmission resource from a plurality of configured transmission resources for retransmitting a TB.

In one embodiment, the determined offset value is at least one of applicable to retransmission of the TB and applicable for determining the transmission resource for retransmitting the TB. In one embodiment, the determined offset value comprises a randomly-generated value.

In one embodiment, the processor 405 further obtains the random value as a uniform distribution from an interval with configurable lower and upper bounds. In one embodiment, the processor 405 further determines the upper bound as a function of at least one of a quality of service ("QoS") requirement of the mobile wireless communication network and a number of retransmissions of the TB.

In one embodiment, the processor 405 further resets a retransmission counter used to determine the upper bound in response to retransmission of the TB being scheduled by a dynamic grant. In one embodiment, the determined offset value is one of exponentially increased for each retransmission attempt and randomized for each retransmission attempt in response to not receiving a request for a retransmission from the mobile wireless communication network.

In one embodiment, the adjusted retransmission timer is started in response to expiration of an initial retransmission timer such that retransmission of the TB occurs in response to expiration of the initial retransmission timer and the adjusted retransmission timer. In one embodiment, in response to the offset value being a negative value, the processor 405 further resets the retransmission timer to its initial value.

In one embodiment, the processor 405 further, in response to a configured grant resource occurring within a time slot while the adjusted retransmission timer is not expired, skips the configured grant resource so that retransmission of the TB on the configured grant resource does not occur.

In one embodiment, the transceiver 425 transmits different data associated with a different HARQ process on the skipped configured grant resource. In one embodiment, the determined offset value is zero in response to a periodicity of the configured grant satisfying a predetermined threshold. In one embodiment, the processor 405 further identifies additional configured grant resources that can be used for retransmission of the TB and retransmitting the TB on the identified additional configured grant resources in response to a priority of the TB satisfying a predetermined priority.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to adjusting retransmission timing for a configured grant. For example, the memory 410 may store various parameters, panel/beam configurations, resource assignments, policies, and the like as described above. In certain embodiments, the memory 410 also stores program code and related data, such as an operating system or other controller algorithms operating on the user equipment apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the user equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all, or portions of the output device 420 may be integrated with the input device 415. For example, the input device 415 and output device 420 may form a touchscreen or similar touch-sensitive display. In other embodiments, the output device 420 may be located near the input device 415.

The transceiver 425 communicates with one or more network functions of a mobile communication network via one or more access networks. The transceiver 425 operates under the control of the processor 405 to transmit messages, data, and other signals and also to receive messages, data, and other signals. For example, the processor 405 may selectively activate the transceiver 425 (or portions thereof) at particular times in order to send and receive messages.

The transceiver 425 includes at least transmitter 430 and at least one receiver 435. One or more transmitters 430 may be used to provide UL communication signals to a base unit 121, such as the UL transmissions described herein. Similarly, one or more receivers 435 may be used to receive DL communication signals from the base unit 121, as described herein. Although only one transmitter 430 and one receiver 435 are illustrated, the user equipment apparatus 400 may have any suitable number of transmitters 430 and receivers 435. Further, the transmitter(s) 430 and the receiver(s) 435 may be any suitable type of transmitters and receivers. In one embodiment, the transceiver 425 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 425, transmitters 430, and receivers 435 may be implemented as physically separate components that access a shared hardware resource and/or software resource, such as for example, the network interface 440.

In various embodiments, one or more transmitters 430 and/or one or more receivers 435 may be implemented and/or integrated into a single hardware component, such as a multi-transceiver chip, a system-on-a-chip, an ASIC, or other type of hardware component. In certain embodiments, one or more transmitters 430 and/or one or more receivers 435 may be implemented and/or integrated into a multi-chip module. In some embodiments, other components such as the network interface 440 or other hardware components/circuits may be integrated with any number of transmitters 430 and/or receivers 435 into a single chip. In such embodiment, the transmitters 430 and receivers 435 may be logically configured as a transceiver 425 that uses one more common control signals or as modular transmitters 430 and receivers 435 implemented in the same hardware chip or in a multi-chip module.

Figure 5:
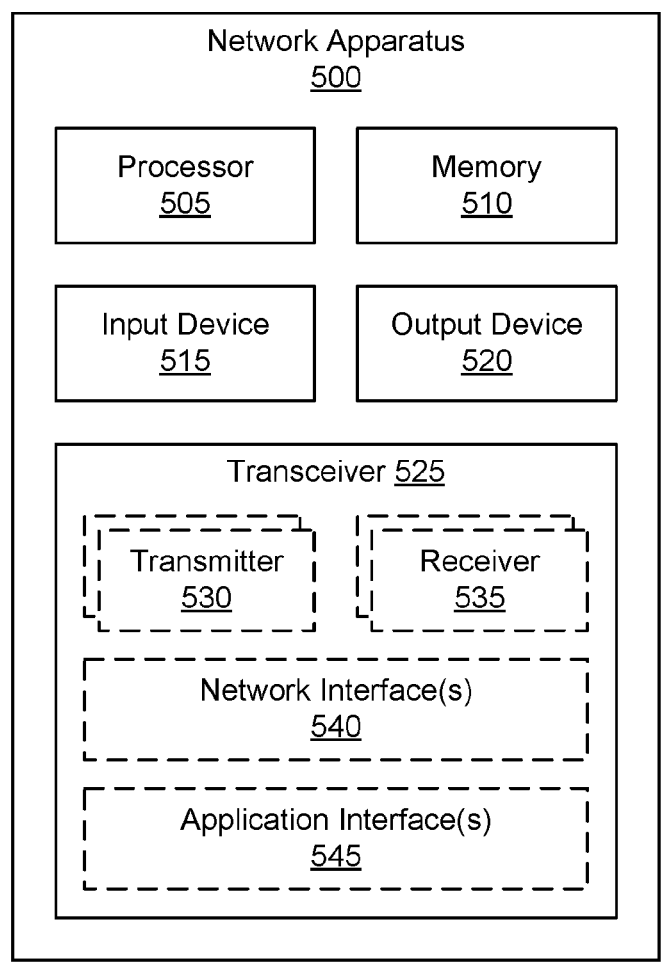
FIG. 5 is a block diagram illustrating one embodiment of a network apparatus that may be used for adjusting retransmission timing for a configured grant.

FIG. 5 depicts a network apparatus 500 that may be used for adjusting retransmission timing for a configured grant, according to embodiments of the disclosure. In one embodiment, network apparatus 500 may be one implementation of a RAN node, such as the base unit 121, the RAN node 210, or gNB, described above. Furthermore, the base network apparatus 500 may include a processor 505, a memory 510, an input device 515, an output device 520, and a transceiver 525.

In some embodiments, the input device 515 and the output device 520 are combined into a single device, such as a touchscreen. In certain embodiments, the network apparatus 500 may not include any input device 515 and/or output device 520. In various embodiments, the network apparatus 500 may include one or more of: the processor 505, the memory 510, and the transceiver 525, and may not include the input device 515 and/or the output device 520.

As depicted, the transceiver 525 includes at least one transmitter 530 and at least one receiver 535. Here, the transceiver 525 communicates with one or more remote units 105. Additionally, the transceiver 525 may support at least one network interface 540 and/or application interface 545. The application interface(s) 545 may support one or more APIs. The network interface(s) 540 may support 3GPP reference points, such as Uu, N1, N2 and N3. Other network interfaces 540 may be supported, as understood by one of ordinary skill in the art.

The processor 505, in one embodiment, may include any known controller capable of executing computer-readable instructions and/or capable of performing logical operations. For example, the processor 505 may be a microcontroller, a microprocessor, a CPU, a GPU, an auxiliary processing unit, a FPGA, or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 500 is a RAN node (e.g., gNB) that includes a processor 505 and a transceiver 525. In one embodiment, the processor 505 determines an offset value for a retransmission timer associated with a configured grant for communications between a user equipment ("UE") and a mobile wireless communication network. In one embodiment, the transceiver 525 transmits the offset value to the UE. In one embodiment, the processor 505 configures the UE to apply the offset value to the retransmission timer associated with the configured grant for retransmissions of transport blocks ("TBs") from the UE to the mobile wireless communication network.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to adjusting retransmission timing for a configured grant. For example, the memory 510 may store parameters, configurations, resource assignments, policies, and the like, as described above. In certain embodiments, the memory 510 also stores program code and related data, such as an operating system or other controller algorithms operating on the network apparatus 500.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the network apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all, or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to communicate with the UE, as described herein. Similarly, one or more receivers 535 may be used to communicate with network functions in the NPN, PLMN and/or RAN, as described herein. Although only one transmitter 530 and one receiver 535 are illustrated, the network apparatus 500 may have any suitable number of transmitters 530 and receivers 535. Further, the transmitter(s) 530 and the receiver(s) 535 may be any suitable type of transmitters and receivers.

Figure 6:
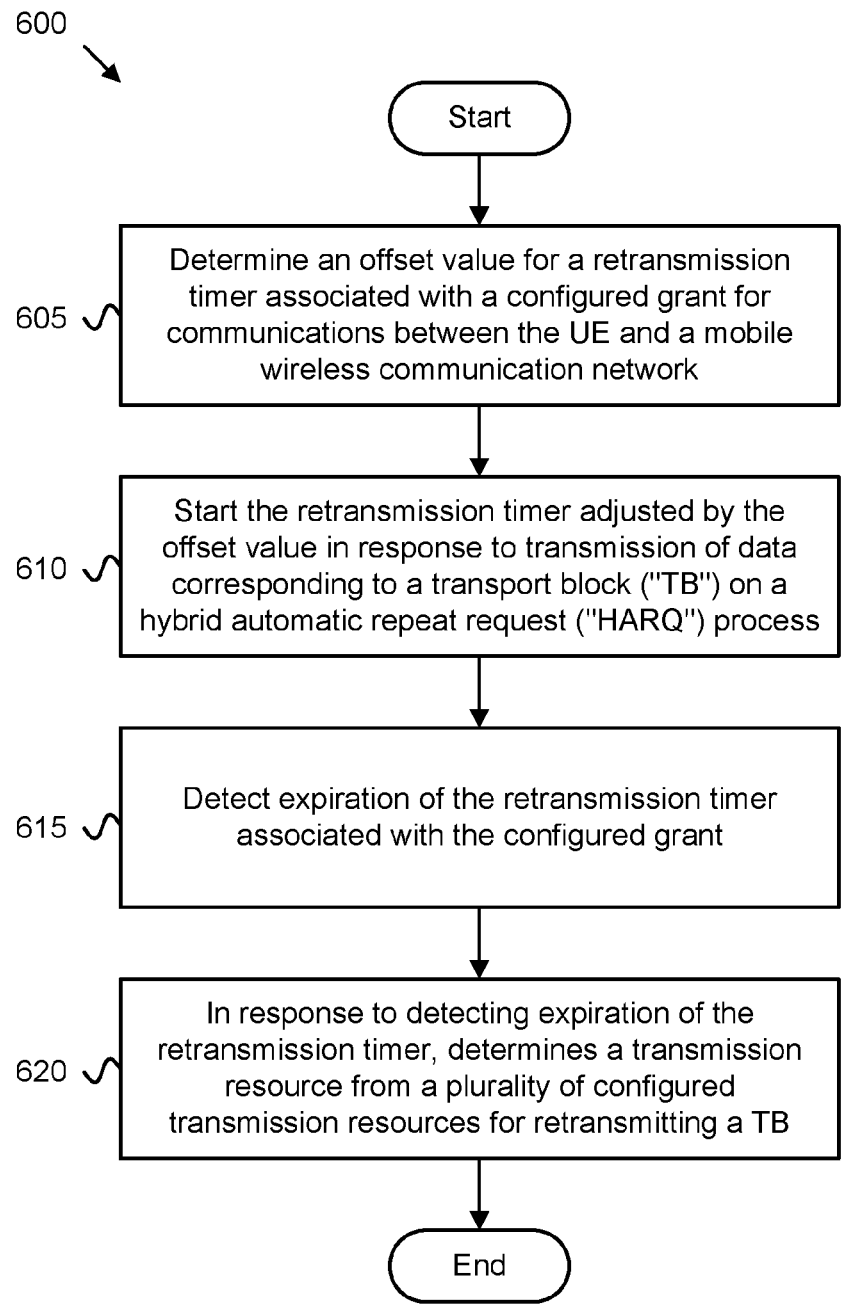
FIG. 6 is a flowchart diagram illustrating one embodiment of a method for adjusting retransmission timing for a configured grant.

FIG. 6 is a flowchart diagram of a method 600 for adjusting retransmission timing for a configured grant. The method 600 may be performed by a UE as described herein, for example, the remote unit 105, the UE 205 and/or the user equipment apparatus 400. In some embodiments, the method 600 may be performed by a processor executing program code, for example, a microcontroller, a microprocessor, a CPU, a GPU, an auxiliary processing unit, a FPGA, or the like.

In one embodiment, the method 600 includes determining 605 an offset value for a retransmission timer associated with a configured grant for communications between the UE and a mobile wireless communication network. In one embodiment, the method 600 includes starting 610 the retransmission timer adjusted by the offset value in response to transmission of data corresponding to a transport block ("TB") on a hybrid automatic repeat request ("HARQ") process.

In one embodiment, the method 600 detects 615 expiration of the retransmission timer associated with the configured grant. In one embodiment, the method 600, in response to detecting expiration of the retransmission timer, determines 620 a transmission resource from a plurality of configured transmission resources for retransmitting a TB. The method 600 ends.

Figure 7:
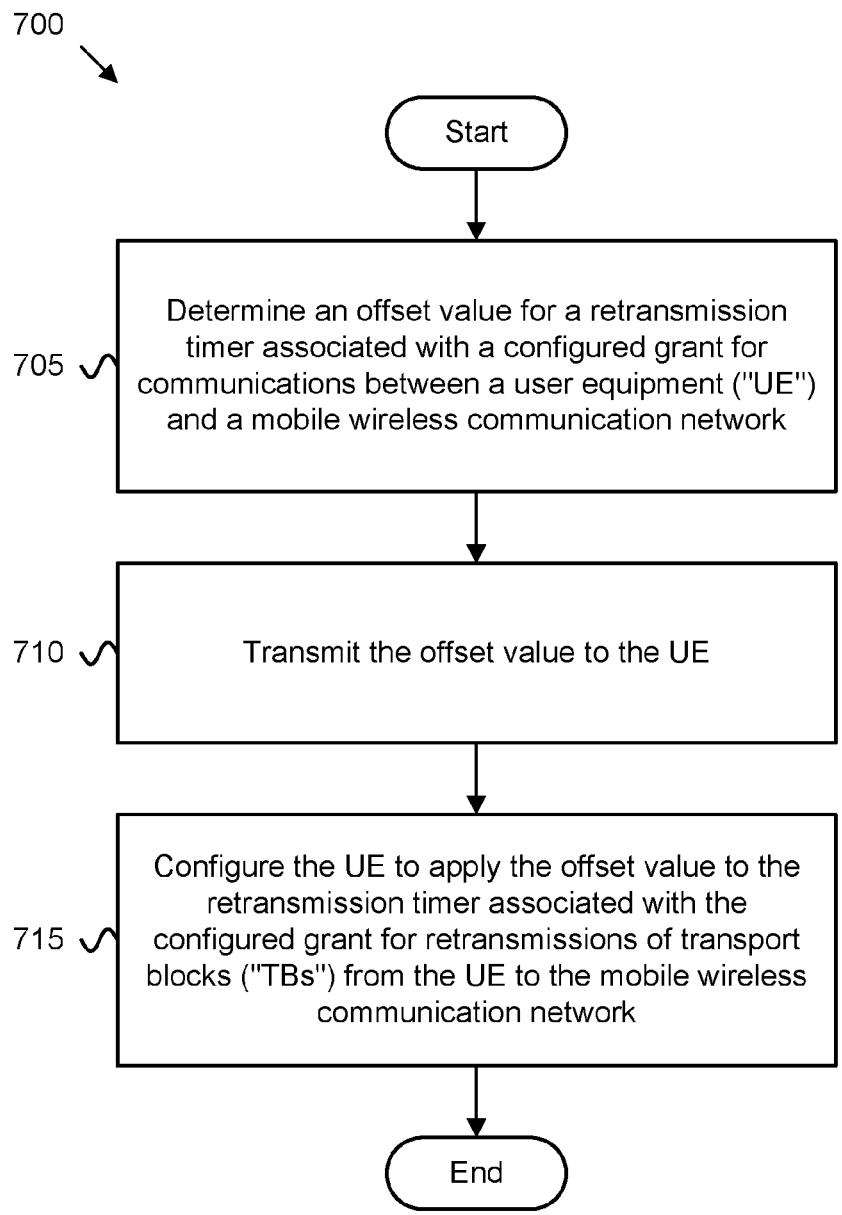
FIG. 7 is a flowchart diagram illustrating one embodiment of another method for adjusting retransmission timing for a configured grant.

FIG. 7 is a flowchart diagram of a method 700 for adjusting retransmission timing for a configured grant. The method 700 may be performed by a network entity such as a gNB or other network equipment apparatus 500. In some embodiments, the method 700 may be performed by a processor executing program code, for example, a microcontroller, a microprocessor, a CPU, a GPU, an auxiliary processing unit, a FPGA, or the like.

In one embodiment, the method 700 includes determining 705 an offset value for a retransmission timer associated with a configured grant for communications between a user equipment ("UE") and a mobile wireless communication network. In one embodiment, the method 700 includes transmitting 710 the offset value to the UE. In one embodiment, the method 700 includes configuring 715 the UE to apply the offset value to the retransmission timer associated with the configured grant for retransmissions of transport blocks ("TBs") from the UE to the mobile wireless communication network. The method 700 ends.

A first apparatus is disclosed for adjusting retransmission timing for a configured grant. In one embodiment, the first apparatus may include a UE as described herein, for example, the remote unit 105, the UE 205 and/or the user equipment apparatus 400. In some embodiments, the first apparatus may include a processor executing program code, for example, a microcontroller, a microprocessor, a CPU, a GPU, an auxiliary processing unit, a FPGA, or the like.

In one embodiment, the first apparatus includes a processor that determines an offset value for a retransmission timer associated with a configured grant for communications between the UE and a mobile wireless communication network. In one embodiment, the processor starts the retransmission timer adjusted by the offset value in response to transmission of data corresponding to a transport block ("TB") on a hybrid automatic repeat request ("HARQ") process. In one embodiment, the processor detects expiration of the retransmission timer associated with the configured grant. In one embodiment, in response to detecting expiration of the retransmission timer, the processor determines a transmission resource from a plurality of configured transmission resources for retransmitting a TB.

In one embodiment, the determined offset value is at least one of applicable to retransmission of the TB and applicable for determining the transmission resource for retransmitting the TB. In one embodiment, the determined offset value comprises a randomly-generated value.

In one embodiment, the processor further obtains the random value as a uniform distribution from an interval with configurable lower and upper bounds. In one embodiment, the processor further determines the upper bound as a function of at least one of a quality of service ("QoS") requirement of the mobile wireless communication network and a number of retransmissions of the TB.

In one embodiment, the processor further resets a retransmission counter used to determine the upper bound in response to retransmission of the TB being scheduled by a dynamic grant. In one embodiment, the determined offset value is one of exponentially increased for each retransmission attempt and randomized for each retransmission attempt in response to not receiving a request for a retransmission from the mobile wireless communication network.

In one embodiment, the adjusted retransmission timer is started in response to expiration of an initial retransmission timer such that retransmission of the TB occurs in response to expiration of the initial retransmission timer and the adjusted retransmission timer. In one embodiment, in response to the offset value being a negative value, the processor further resets the retransmission timer to its initial value.

In one embodiment, the processor further, in response to a configured grant resource occurring within a time slot while the adjusted retransmission timer is not expired, skips the configured grant resource so that retransmission of the TB on the configured grant resource does not occur.

In one embodiment, the apparatus includes a transceiver that transmits different data associated with a different HARQ process on the skipped configured grant resource. In one embodiment, the determined offset value is zero in response to a periodicity of the configured grant satisfying a predetermined threshold. In one embodiment, the processor further identifies additional configured grant resources that can be used for retransmission of the TB and retransmitting the TB on the identified additional configured grant resources in response to a priority of the TB satisfying a predetermined priority.

A first method is disclosed for adjusting retransmission timing for a configured grant. The first method may be performed by a UE as described herein, for example, the remote unit 105, the UE 205 and/or the user equipment apparatus 400. In some embodiments, the first method may be performed by a processor executing program code, for example, a microcontroller, a microprocessor, a CPU, a GPU, an auxiliary processing unit, a FPGA, or the like.

In one embodiment, the first method includes determining an offset value for a retransmission timer associated with a configured grant for communications between the UE and a mobile wireless communication network. In one embodiment, the first method includes starting the retransmission timer adjusted by the offset value in response to transmission of data corresponding to a transport block ("TB") on a hybrid automatic repeat request ("HARQ") process. In one embodiment, the first method includes detecting expiration of the retransmission timer associated with the configured grant. In one embodiment, in response to detecting expiration of the retransmission timer, the first method includes determining a transmission resource from a plurality of configured transmission resources for retransmitting a TB.

In one embodiment, the determined offset value is at least one of applicable to retransmission of the TB and applicable for determining the transmission resource for retransmitting the TB. In one embodiment, the determined offset value comprises a randomly-generated value.

In one embodiment, the first method includes obtaining the random value as a uniform distribution from an interval with configurable lower and upper bounds. In one embodiment, the first method includes determining the upper bound as a function of at least one of a quality of service ("QoS") requirement of the mobile wireless communication network and a number of retransmissions of the TB.

In one embodiment, the first method includes resetting a retransmission counter used to determine the upper bound in response to retransmission of the TB being scheduled by a dynamic grant. In one embodiment, the determined offset value is one of exponentially increased for each retransmission attempt and randomized for each retransmission attempt in response to not receiving a request for a retransmission from the mobile wireless communication network.

In one embodiment, the adjusted retransmission timer is started in response to expiration of an initial retransmission timer such that retransmission of the TB occurs in response to expiration of the initial retransmission timer and the adjusted retransmission timer. In one embodiment, in response to the offset value being a negative value, the first method includes resetting the retransmission timer to its initial value.

In one embodiment, the first method includes, in response to a configured grant resource occurring within a time slot while the adjusted retransmission timer is not expired, skipping the configured grant resource so that retransmission of the TB on the configured grant resource does not occur.

In one embodiment, the first method includes transmitting different data associated with a different HARQ process on the skipped configured grant resource. In one embodiment, the determined offset value is zero in response to a periodicity of the configured grant satisfying a predetermined threshold. In one embodiment, the first method includes identifying additional configured grant resources that can be used for retransmission of the TB and retransmitting the TB on the identified additional configured grant resources in response to a priority of the TB satisfying a predetermined priority.

A second apparatus is disclosed for adjusting retransmission timing for a configured grant. In one embodiment, the second apparatus may include a network entity such as a gNB or other network equipment apparatus 500. In some embodiments, the second apparatus may include a processor executing program code, for example, a microcontroller, a microprocessor, a CPU, a GPU, an auxiliary processing unit, a FPGA, or the like.

In one embodiment, the second apparatus includes a processor that determines an offset value for a retransmission timer associated with a configured grant for communications between a user equipment ("UE") and a mobile wireless communication network. In one embodiment, the second apparatus includes a transceiver that transmits the offset value to the UE. In one embodiment, the processor configures the UE to apply the offset value to the retransmission timer associated with the configured grant for retransmissions of transport blocks ("TBs") from the UE to the mobile wireless communication network.

A second method is disclosed for adjusting retransmission timing for a configured grant. The second method may be performed by a network entity such as a gNB or other network equipment apparatus 500. In some embodiments, the second method may be performed by a processor executing program code, for example, a microcontroller, a microprocessor, a CPU, a GPU, an auxiliary processing unit, a FPGA, or the like.

In one embodiment, the second method includes determining an offset value for a retransmission timer associated with a configured grant for communications between a user equipment ("UE") and a mobile wireless communication network. In one embodiment, the second method includes transmitting the offset value to the UE. In one embodiment, the second method includes configuring the UE to apply the offset value to the retransmission timer associated with the configured grant for retransmissions of transport blocks ("TBs") from the UE to the mobile wireless communication network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the memory and configured to cause the UE to:
determine an offset value for a retransmission timer associated with a configured grant, the offset value comprising a value that is randomly generated within an interval that has an upper bound defined as a function of at least one of a quality of service ("QoS") requirement and a number of retransmissions of a transport block ("TB");
adjust the retransmission timer based at least in part on the offset value;
start the adjusted retransmission timer in response to a transmission of a TB of a hybrid automatic repeat request ("HARQ") process;
detect an expiration of the adjusted retransmission timer; and
in response to the expiration of the adjusted retransmission timer, determine a resource associated with the configured grant for retransmitting the TB.

2. The UE of claim 1, wherein the offset value is associated with retransmission of the TB, determining the resource associated with the configured grant for retransmitting the TB, or a combination thereof.

3. The UE of claim 1, wherein the offset value comprises a randomly-generated value.

4. The UE of claim 3, wherein the at least one processor is configured to cause the UE to obtain the random value as a uniform distribution from a second interval with configurable lower and upper bounds.

5. The UE of claim 1, wherein the at least one processor is configured to cause the UE to reset a retransmission counter used to determine the upper bound in response to retransmission of the TB being scheduled by a dynamic grant.

6. The UE of claim 1, wherein the offset value is:
exponentially increased for each retransmission attempt;
randomized for each retransmission attempt in response to not receiving a request for a retransmission; or
a combination thereof.

7. The UE of claim 1, wherein the adjusted retransmission timer is started in response to expiration of an initial retransmission timer such that retransmission of the TB occurs in response to expiration of the initial retransmission timer and the adjusted retransmission timer.

8. The UE of claim 1, wherein, in response to the offset value being a negative value, the at least one processor is configured to cause the UE to reset the adjusted retransmission timer to its initial value.

9. The UE of claim 1, wherein the at least one processor is configured to cause the UE to, in response to a configured grant resource occurring within a time slot while the adjusted retransmission timer is not expired, skip the configured grant resource so that retransmission of the TB on the configured grant resource does not occur.

10. The UE of claim 9, wherein the at least one processor is configured to cause the UE to transmit different data associated with a different HARQ process on the skipped configured grant resource.

11. The UE of claim 1, wherein the offset value is zero in response to a periodicity of the configured grant satisfying a predetermined threshold.

12. The UE of claim 1, wherein the at least one processor is configured to cause the UE to identify additional configured grant resources that can be used for retransmission of the TB and retransmit the TB on the identified additional configured grant resources in response to a priority of the TB satisfying a predetermined priority.

13. A method performed by a user equipment (UE), comprising:
determining an offset value for a retransmission timer associated with a configured grant, the offset value comprising a value that is randomly generated within an interval that has an upper bound defined as a function of at least one of a quality of service ("QoS") requirement and a number of retransmissions of a transport block ("TB");
adjusting the retransmission timer based at least in part on the offset value;
starting the adjusted retransmission timer in response to a transmission of a TB of a hybrid automatic repeat request ("HARQ") process;
detecting an expiration of the adjusted retransmission timer; and
in response to the expiration of the adjusted retransmission timer, determining a resource associated with the configured grant for retransmitting the TB.

14. The method of claim 13, wherein the offset value is associated with retransmission of the TB, determining a transmission resource for retransmitting the TB, or a combination thereof.

15. The method of claim 13, wherein the offset value comprises a randomly-generated value.

16. The method of claim 15, further comprising obtaining the random value as a uniform distribution from a second interval with configurable lower and upper bounds.

17. The method of claim 13, further comprising resetting a retransmission counter used to determine the upper bound in response to retransmission of the TB being scheduled by a dynamic grant.

18. The method of claim 13, wherein the offset value is:
exponentially increased for each retransmission attempt;
randomized for each retransmission attempt in response to not receiving a request for a retransmission; or
a combination thereof.

19. A network equipment, comprising:
at least one memory; and
at least one processor coupled with the memory and configured to cause the network equipment to:
determine an offset value for a retransmission timer associated with a configured grant, the offset value comprising a value that is randomly generated within an interval that has an upper bound defined as a function of at least one of a quality of service ("QoS") requirement and a number of retransmissions of a transport block ("TB"); and
transmit the offset value to a user equipment ("UE") for adjusting the retransmission timer for retransmissions of TBs.

20. A method performed by a network equipment, comprising:
- determining an offset value for a retransmission timer associated with a configured grant, the offset value comprising a value that is randomly generated within an interval that has an upper bound defined as a function of at least one of a quality of service ("QoS") requirement and a number of retransmissions of a transport block ("TB"); and
- transmitting the offset value to a user equipment ("UE") for adjusting the retransmission timer for retransmissions of TBs.

* * * * *